United States Patent [19]
Hulderman et al.

[11] Patent Number: 6,025,795
[45] Date of Patent: Feb. 15, 2000

[54] MISSILE SHIELD

[75] Inventors: Garry N. Hulderman, Riverside; Bernard W. Drewes; Allen C. Hagelberg, both of Upland, all of Calif.

[73] Assignee: Raytheon Company, Lexington, Mass.

[21] Appl. No.: 08/768,719

[22] Filed: Dec. 18, 1996

[51] Int. Cl.⁷ ................................................. G01S 13/78
[52] U.S. Cl. ............................................................ 342/45
[58] Field of Search ................................. 342/45, 42, 43, 342/44, 46, 47, 51

[56] References Cited

U.S. PATENT DOCUMENTS

| | | | |
|---|---|---|---|
| 5,001,488 | 3/1991 | Joguet | 342/45 |
| 5,327,145 | 7/1994 | Jelinek | 342/13 |

FOREIGN PATENT DOCUMENTS

| | | | |
|---|---|---|---|
| 3150173 | 7/1983 | Germany | 342/45 |

*Primary Examiner*—Daniel T. Pihulic
*Attorney, Agent, or Firm*—David W. Collins; Leonard A. Alkov; Glenn H. Lenzen, Jr.

[57] ABSTRACT

A covert and secure communication system which employs a very narrow bandwidth to permit receivers to be very sensitive to low power signals while maintaining acceptable signal-to-noise ratios. In the preferred embodiment, the system operates at the millimeter wavelength which, because of very high attenuation in atmosphere, will be undetectable beyond a very limited range. In another embodiment of the invention, the covert communication system is applied to an IFF system in conjunction with a homing missile. The IFF system of the present invention may be used as a back-up to confirm that a target is a foe by transmitting to and receiving a confirming signal from the target at the terminal portion of the engagement. For example, transmission between the target and missile may occur when the target and missile are less than 2,000 feet apart. The system is even less detectable and more secure because transmission only occurs during the very last portion of missile engagement which avoids the long range transmission of conventional IFF systems.

12 Claims, 5 Drawing Sheets

| SYSTEM CHARACTERISTICS | |
|---|---|
| $P_A$ = | +20 dB (100 mWatts) |
| $G_M$ = | +20 dB (23 degBeam W) |
| $G_A$ = | 0 dB (90 degbeamW) |
| $\lambda^2$ = | −36 dB (60 GHz) |
| $\dfrac{1}{(4\pi)^2}$ = | −22 dB |
| $\dfrac{1}{R^2}$ = | −60 dB (1000 Feet) |
| $\dfrac{1}{KT}$ = | +174 dB |
| $\dfrac{1}{B}$ = | −48 dB (66 KHz) |
| $\dfrac{1}{NF_L}$ = | −13 dB (Rec.NoiseFig.) |
| $\dfrac{1}{F_L}$ = | −5 dB (Atmos. Atten) |
| S/N = | +30 dB (Rec S/N Ratio) |

*FIG. 2B*

| SYSTEM CHARACTERISTICS | |
|---|---|
| $P_M$ = | +18 dB (65 mWatts) |
| $G_M$ = | +20 dB (23 degBeam W) |
| $G_A$ = | 0 dB (90 degbeamW) |
| $\lambda^2$ = | −36 dB (60 GHz) |
| $\dfrac{1}{(4\pi)^2}$ = | −22 dB |
| $\dfrac{1}{R^2}$ = | −60 dB (1000 Feet) |
| $\dfrac{1}{KT}$ = | +174 dB |
| $\dfrac{1}{B}$ = | −40 dB (10KHz) |
| $\dfrac{1}{NF_L}$ = | −13 dB (Rec.NoiseFig.) |
| $\dfrac{1}{\gamma_L}$ = | −5 dB (Atmos. Atten) |
| S/N = | +36 dB (Rec S/N Ratio) |

*FIG. 3B*

MISSILE SHIELD

BACKGROUND OF THE INVENTION

1. Field of the Invention

This invention relates generally to secure communication systems, and more particularly, to a high frequency covert communication IFF system which can receive low power narrow bandwidth signals.

2. Description of the Related Art

There has been a long-standing concern with the security of communication systems employing electromagnetic radiation. This concern has arisen due to the relative ease with which most transmitted communications signals can be intercepted by unauthorized persons. While undesirable in any situation, this is most critical, and life threatening, in modern warfare. While many countermeasures such as cryptography have been developed to alleviate these problems, even where the transmitted message cannot be deciphered by an enemy, the fact that the enemy can receive a signal originating from a particular point creates problems. This is because the signal may give sufficient information about the location and velocity of the transmitter to permit the enemy to destroy the detected transmitting source, whether it be stationary or on a vehicle based on land, sea or air.

These problems are particularly acute in Identification-Friend-or-Foe (IFF) systems. IFF and similar transponder systems are traditionally used to allow a transponder in an airplane or other vehicle to respond in a particular way to a special signal from an interrogating ground station or aircraft. Information of this nature is vitally important to a military aircraft-intercept station desirous of knowing whether an approaching aircraft is friend or foe. Similar systems are also found in air traffic control interrogation systems.

In the typical interrogation transmitter system, an interrogation request is first transmitted. This request comprises a coded signal or message consisting of a train of pulses spaced along in time. This coded signal is received by the IFF transponder and analyzed. If the pulses are of the correct predetermined frequency, amplitude and spacing, a predetermined signal would be produced by the transponder. The expected response will then notify the interrogator that the recipient was a friend and not a foe. On the other hand, should no response or an incorrect response be sent, the interrogating system may take that to mean that target is a foe and a decision can then be made as to whether to initiate an attack upon it.

It is important that communications in systems such as IFF's be covert and secure for many reasons. For example, one problem with IFF systems is that since the system radiates a signal on demand (or, in some systems, continuously), if this radiated signal is detected by an enemy it can be used to locate and destroy its source. The mere fact that each side of the IFF system is transmitting information could allow an enemy to track, locate and destroy the sources of the signals. In some cases where a system responds on demand to an interrogation, an enemy could transmit a signal mimicking the interrogation signal to the receiver and use the response as a way to locate it. Part of the problem with IFF systems is that a relatively strong signal must be transmitted by both sides to enable it to be detected at relatively great distances. Yet, lowering of power of the signals would also require a corresponding increase in sensitivity of receivers, which also would significantly reduce the signal-to-noise ratio to the point to where the signal could not be detected.

Another problem with a lack of covert communication in IFF systems may result where an enemy is able to listen to both the interrogation and the responding signal and then configure its own aircraft to respond similarly. In this way, even enemy targets would appear as friend when interrogated and would likely not be attacked.

Outside of the IFF environment, there are many situations, both military and non-military, where it is desired to permit covert communications between two parties wherein the existence of the communication cannot be detected by outsiders beyond a limited physical distance. For example, there is a need for two aircraft in the same flight to be able to engage in communications between each other while maintaining electronic communication silence beyond a limited range.

In addition, while IFF systems are designed to prevent fratricide, equipment and/or human errors do arise which can allow such events to occur. This can happen due to a variety of causes. These causes may include: improper visual target identification prior to a missile launch; or non-operational or improperly set IFF equipment for beyond visual range engagement. In the case of homing missiles, fratricide can occur due to improper missile lock-on or in-flight reacquisition due to a confused tactical situation such as could exist during a close "furball" engagement. False target identification can also result when both friend and foe utilize identical-type aircraft due to changing political situations.

Thus, it would be desirable to provide an improved method of communication through electromagnetic radiation which is secure, covert and undetectable beyond a very limited distance. It would also be desirable to provide an improved or supplementary IFF system which does not rely on communications that can be readily detected by an enemy. It would further be desirable to improve IFF systems so that they are foolproof and more covert by providing more secure and covert communications. It would also be desirable to provide a communications system which can operate at extremely low power while achieving a satisfactory signal/noise ratio.

Furthermore, it would be desirable to provide an improved IFF system which overcomes the above-discussed situations which can result, and have in the past resulted, in fratricide. Thus, it would be desirable to provide a back-up IFF system which provides a fail-safe mechanism in the event that a conventional IFF system fails.

SUMMARY OF THE INVENTION

The present invention provides a covert and secure communication system which operates at close range. In the preferred embodiment it utilizes a millimeter wave communication signal which, because of its high attenuation, cannot be detected by unauthorized persons beyond a very limited range. It employs a very narrow bandwidth to permit receivers to be very sensitive to low power signals while maintaining an acceptable signal-to-noise ratio.

In one embodiment of the present invention, a communication system includes a first transceiver on a first communication unit for transmitting and receiving signals in the millimeter wavelength range. A second transceiver on a second communication unit also transmits and receives signals in the millimeter wavelength range. The first and second transceivers include narrow band receivers and transmitters that are phase locked to a highly stable crystal source, wherein the second transceiver receives and locks onto the first transceiver signal, offsets its transmitter frequency by a predetermined amount and transmits a newly formatted signal back to the first transceiver. To further improve the security of communication in the preferred embodiment the second transceiver includes a means for adding a predetermined code to the signal it transmits and the first transceiver includes a code comparison unit for determining if the received code from the second transceiver matches the code.

Because the communication system operates in the millimeter wavelength range, it cannot be detected beyond a very limited distance. Furthermore, due to the use of a narrow bandwidth, the system can detect relatively weak millimeter wave signals at acceptable signal-to-noise levels.

In accordance with another embodiment of the present invention, the techniques for covert communication are applied to an IFF system used with a homing missile. The IFF system, in accordance with this embodiment of the invention, comprises a first transceiver on the missile for transmitting and receiving signals between the missile and the target, and a second transceiver on the target for receiving signals transmitted by the missile and, in response thereto, transmitting a coded signal to the missile. A processor on the missile receives and interprets the coded signal from the target to determine whether the coded signal matches a predetermined code. A control means on the missile responsive to the processor initiates a diverting maneuver by the missile when the processor determines that the received coded signal matches the predetermined code, so that the missile avoids reaching the target.

In the preferred embodiment of the invention, the IFF system utilizes a millimeter wavelength transmission signal which attenuates rapidly in atmosphere, and thus is virtually undetectable by unauthorized systems. The IFF system may operate as a fail safe in conjunction with conventional IFF systems to confirm a determination that a target is a foe by receiving a confirming signal indicating that a target is a friend or foe at the terminal portion of the engagement. For example, the transmission between the target and missile may occur when the target and missile are less than 2,000 feet apart. The system is small, inexpensive, easy to install, secure and covert. Also, each system actively transmits only during the terminal portion of the missile engagement, thus avoiding long range transmission of conventional IFF systems which can cause them to be detectable and less secure.

BRIEF DESCRIPTION OF THE DRAWING

The objects, advantages and features of this invention will be more readily perceived from the following detailed description, when read in conjunction with the accompanying drawing, in which:

FIG. 2B is a table of system characteristics of the unit shown in FIG. 2A;

FIG. 3B is a table of system characteristics of the unit shown in FIG. 3A;

DETAILED DESCRIPTION OF THE PREFERRED EMBODIMENTS

The covert communication system of this invention is a millimeter wave, short-range secure communications system which resists detection by unauthorized receivers. The millimeter wave communication signal is highly attenuated in atmosphere, thus making the signals impossible to detect beyond a limited range. The system employs very narrow bandwidth receivers to achieve the desired signal-to-noise ratio with a low power signal.

Figure 1:
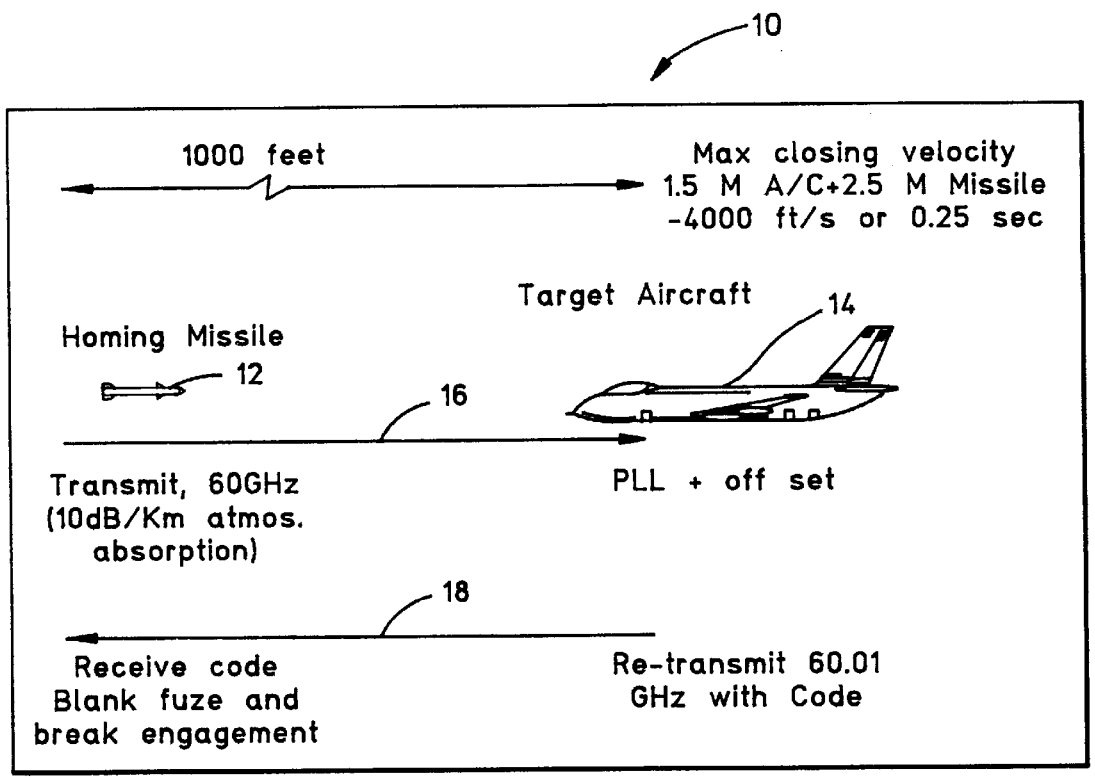
FIG. 1 is a diagram of the operation of an IFF system in accordance with the present invention.

With reference now to the drawing, FIG. 1 illustrates a diagram of a preferred embodiment of the covert communication system of the present invention employed in a homing missile. This embodiment of the invention is also referred to as a "missile shield" system 10. A homing missile 12 is equipped with transmitter and receiver as described in more detail below. It will be appreciated that when homing missiles are engaged in ground-to-air or air-to-air warfare there is the possibility of fratricide due to a variety of causes. These can range from improper visual target identification prior to missile launch, non-operational or improperly set IFF equipment for beyond visual range engagements, or an improper lock-on or in-flight reacquisition due to a confused tactical situation.

In any event, to ensure against fratricide attacks, the homing missile 12 has been imparted with an intelligence factor which will recognize a friendly aircraft during the terminal portion of an engagement and act thereon to prevent a kill. Both the homing missile 12 and the target aircraft 14 (if friendly) utilize a solid state millimeter wave interrogation system. The systems in both the homing missile 12 and target aircraft 14 actively transmit only during the terminal portion of the missile engagement. This makes the system highly covert, since, due to the high attenuation of millimeter wave signals in the atmosphere, these signals can only be detected by other aircraft within a very short range such as a maximum of 2,000–3,000 feet.

When approaching its intended target the missile 12 initiates radiation of a highly stable 60 GHz signal in the forward direction of its axis, as illustrated in FIG. 1 by arrow 16. The target aircraft 14, if friendly and outfitted with the present invention, receive and locks onto the missile signal. It then offsets its transmitter frequency by 10 MHz (for example) minus the measured closing doppler frequency, adds a code and transmits the newly formatted signals to the incoming missile. This transmission is represented by arrow 18. Upon receiving the aircraft response, the missile compares the code with its own preset selection and, if correct, disables its fuze and performs a hard maneuver away from the friendly aircraft.

Prior to the situation presented in FIG. 1, the missile and aircraft codes (or optional frequency offsets) are set prior to flight in the same manner as IFF codes are currently set in aircraft. The missile shield system is activated along with the missile guidance electronics, prior to or upon missile launch. The transmitted energy is not radiated at this time but is directed by a ferrite latch circulator into an internal load. In this way the transmitter will be able to transmit immediately without any start-up delay.

It will be appreciated that typically a homing missile will lock onto the target aircraft and, upon launch, will pursue the aircraft utilizing missile guidance IR or RF signals in a conventional manner to follow the aircraft and destroy it. Typically, a confirmation that the target aircraft is a foe will have been made previously using a conventional IFF system. However, due to the above-described problems with conventional IFF systems, it is desired to make a final confirmation that the target aircraft is a foe.

Thus, the missile shield system shown in FIG. 1 will, at a distance of approximately 2,000–3,000 feet, initiate communication with its target. The distance may be detected by missile guidance IR or RF signal power levels which exceed a pre-set threshold. When this threshold is reached, the system in the missile is allowed to radiate from a small fixed forward looking antenna centered along the missile flight axis. The maximum closing velocity will be approximately Mach 1.5 (aircraft)+Mach 2.5 (missile)=4,000 feet per second.

The aircraft receiver is active at all times searching for the missile radiation. Upon detection and lock-up, the aircraft system determines the missile frequency, including Doppler offset, and adjusts its transmitter frequency to provide a fixed frequency offset with Doppler compensation. The preferred offset is about 10 MHz. System lock-up also generates a transmit command which allows the code or offset signal to be radiated to the missile. This sequence occurs at an approximate range of 1,000 feet and requires three milliseconds or less during which time a worst-case closure of 12 feet has occurred. Upon receipt of the coded aircraft signal, the missile receiver detects the coded signal and, if correct, disables its fuze and initiates a break-engagement maneuver. For a head-on engagement of a Mach 1.5 aircraft and Mach 2.5 missile (4,000 feet per second worst-case closing velocity), typically, the latest point where the missile can break off an engagement is 10 missile guidance time constants away, or at range to go of 1,000 feet. This equates to a worst-case or time-to-go of 0.25 seconds. Since total reaction time of the system is in the order of 25 milliseconds, this is approximately 1/10th of the remaining time to go.

A millimeter wave frequency of 60 GHz was selected for the system operation due to the high atmospheric attenuation which exists in this oxygen absorption band. Attenuation levels of 5.5 dB/100 feet at sea level (3 dB/1,000 feet at altitude), combined with narrow receiver bandwidths, low transmitted power levels, and very short transmission times, yield a highly covert system. That is, "narrow bandwidths" refers to bandwidths which are in the range of 1 KHz bandwidth in a 100,000 MHz carrier signal; "low" power levels refers to power levels in the hundreds of milliwatts range; and "very short" transmission times refers to transmission times of about 30 milliseconds. Use of such a short wavelength also results in the feasibility of fabricating a small, light weight, solid state device which would result in a minimum impact to both missile and aircraft air frames.

In an alternative embodiment the present invention could be employed utilizing other frequency ranges having less attenuation. In order to compensate for the lack of attenuation in atmosphere, other frequencies such as X-band could be transmitted at very low power. Low power is feasible because of the short distances involved between the missile and the aircraft. Furthermore, since an enemy would need to have a relatively wide bandwidth to receive the signal to cover a broad band of frequencies, he would not likely be able to detect this signal which would require a very narrow bandwidth as required in accordance with the teachings of the present invention.

Figure 2A:
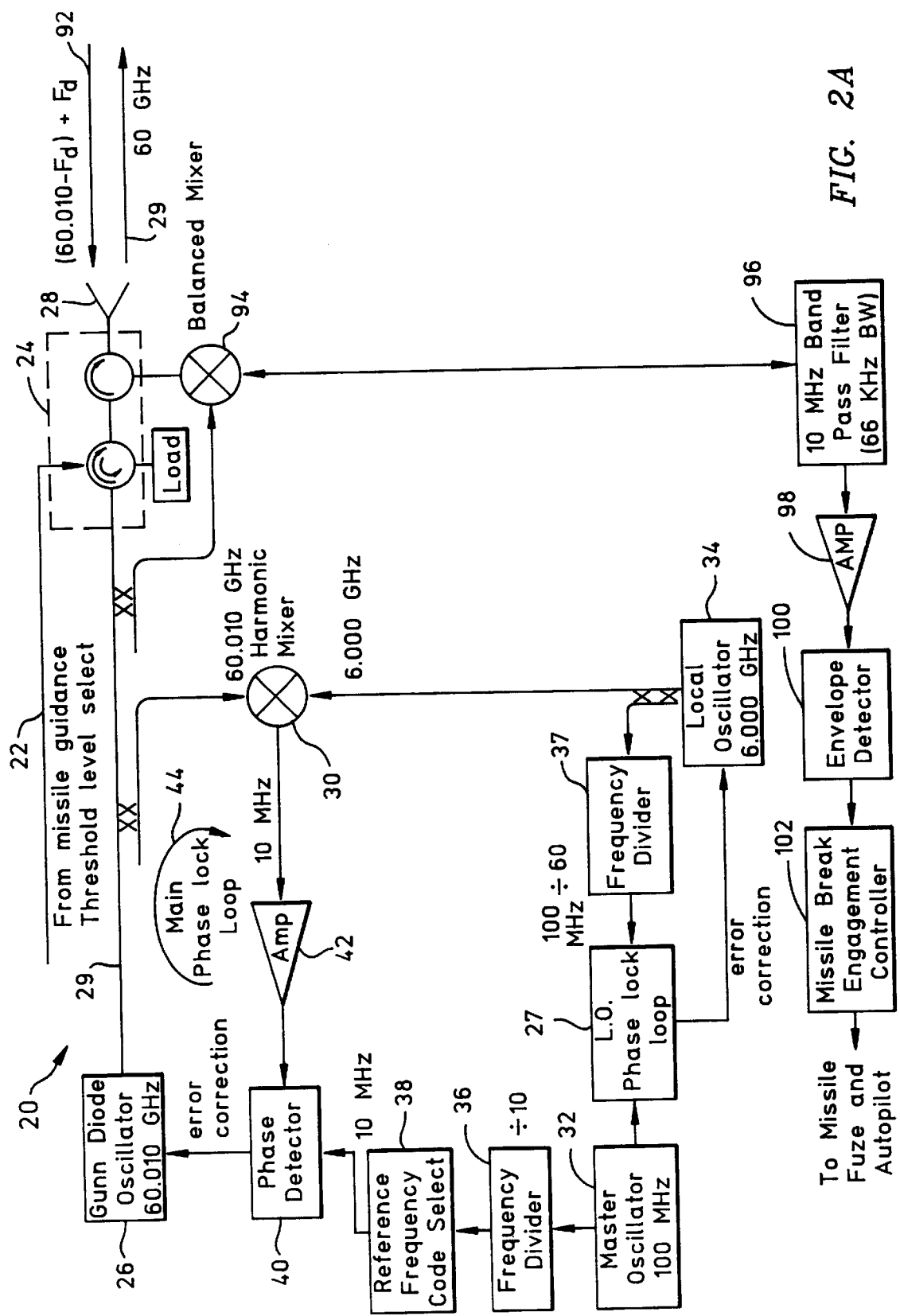
FIG. 2A is a diagram of a communication unit present on the missile shown in the IFF system shown in FIG. 1.

FIG. 2A illustrates a simplified block diagram of the components of the missile unit 20 of the missile shield system 10 of the present invention which is located in the homing missile 12. FIG. 2B is a table of exemplary system characteristics of the system of FIG. 2A. FIG. 2B illustrates how various parameters contribute to the signal-to-noise ratio. The signal-to-noise ratio for the missile unit 20 is 30 dB.

The missile unit 20 receives the above-described threshold activation signal from the missile guidance unit (not shown) indicating that the missile is within approximately 1,000 feet of the target aircraft. This threshold activation signal 22 is received by a ferrite latching circulator 24. Upon receipt of the threshold activation signal, the ferrite latching circulator 24 is switched to the transmit mode. This allows a 60.010 GHz, 65-milliwatt transmitter signal 29 generated by a GUNN diode oscillator 26 to be radiated from a small forward-looking antenna 28. The stability of the oscillator frequency is controlled to an accuracy of 0.5 ppm or better by a local oscillator phase lock loop 27 which compares the output of a harmonic mixer 30 with a 100 MHz crystal stabilized reference oscillator 32. The transmitter's stability is thereby controlled to 60 GHz±30 KHz during a rapid warm-up missile operation. The missile unit 20 includes a local oscillator 34, which has a frequency of 6 GHz. This is the 10th harmonic which is generated in harmonic mixer. This frequency is subtracted from the Gunn diode oscillator 26 frequency in the harmonic mixer. If the Gunn diode oscillator frequency is exactly 10 MHz higher than the 10th harmonic of the local oscillator, then a 10 MHz harmonic mixer output will result. If there is some error in frequency of the Gunn diode oscillator, then the frequency will be plus or minus the 10 MHz by that error amount. An amplifier 42 at the harmonic mixer output, increases the signal to a level necessary to drive a pulse detector 40.

The master oscillator 32 maintains the frequency stability (crystal controlled) for the entire system, and is the frequency reference for the local oscillator 34 and the Gunn diode oscillator 26. Frequency dividers 37, 36 digitally divide or reduce the frequency of the local oscillator 34 from 6 GHz (divided by 60) to 100 MHz, and the master oscillator 32 from 100 MHz (divided by 10) to 10 MHz. The phase detector 40 and the phase detector in the L.O. phase lock loop 27 operate at much lower frequencies making dividers necessary.

A reference frequency code select 38 is optional. In some applications it may be desirable to transmit information/code to the aircraft. A modulation signal containing the information is then used to frequency modulate, in the reference frequency code select 38, the frequency divided signal from the master oscillator 32. The phase detector 40 compares the phase/frequency of its two inputs and generates a voltage which is proportioned to the difference in phase of the two inputs. If the phase/frequency of the reference frequency code select 38 is exactly the same as the harmonic mixer 30, then the phase detector output is zero. In other words, no error correction or frequency change command is sent to the Gunn Diode oscillator 26. If, for example, there is a frequency modulation code, or, an error in the Gunn diode oscillator frequency, a frequency correction command will be sent to the Gunn diode oscillator. In the case of the code modulation, the Gunn diode oscillator will transmit the FM code signal. The main phase lock loop 44 defines all the components that maintain the frequency stability of the Gunn diode oscillator.

Figure 3A:
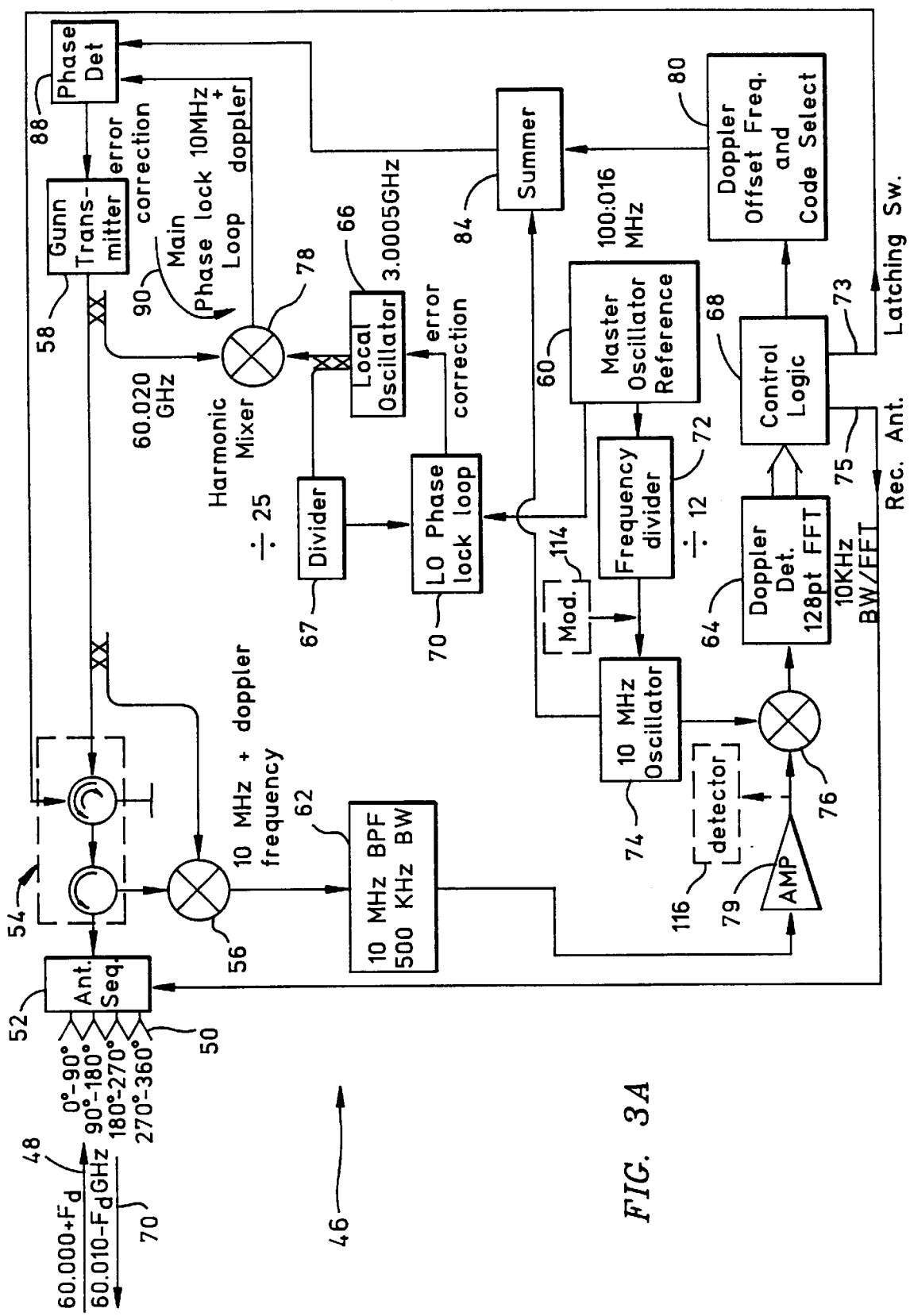
FIG. 3A is a diagram of a communication unit located on the target aircraft of the IFF system shown in FIG. 1.

Referring now to FIG. 3A, the portion of the missile shield system 10 of the present invention which is mounted in the friendly target aircraft is shown. FIG. 3B is a table of exemplary system characteristics of the aircraft unit 46 of FIG. 3A. FIG. 3B (as well as FIG. 2B) illustrates how various parameters contribute to the signal-to-noise ratio. The resulting signal-to-noise ratio for the aircraft unit 46 is 36 dB. A key parameter in FIG. 3B is bandwidth ⅛. The narrower the bandwidth, the less noise entering the system. Noise energy competes with the received signal: the lower the noise, the higher the signal-to-noise ratio, which translates into increased receiver sensitivity. The limiting factor on bandwidth is frequency stability of the two remote independently running oscillators-Gunn diode oscillator 26 in the missile, and the Gunn diode oscillator 58 in the aircraft.

Also, narrow bandwidths allow the transmitted energy (Pa and Pm) to be very low making detection by an unfriendly party only possible at very short ranges. The aircraft unit 46 receives the 60.010 GHz missile signal coming from the missile in one of four wide-beam antennas 50 which are sequentially selected by an antenna sequencer 52. Each of the antennas 50 provide a 90° beam width and thus, a full 360° (4×90°) coverage around the aircraft. Missile to aircraft closing velocities can vary between 4,000 ft/s nose on to 1,000 ft/s for a tail-chase situation. Therefore, a doppler shift varying between 488 KHz and 122 KHz can be generated depending on the actual closing rate. This doppler signal $F_d$ would be added to the 60 GHz signal received from the missile. Since the missile-to-target range is always closing, all Doppler signals are additive. The signal received by the aircraft unit 46 is directed via a ferrite latch circulator 54 to a balanced mixer 56 which is keyed by a portion of the energy from an aircraft GUNN diode transmitter 58. This transmitter 58 is offset by about 10 MHz (60.010 GHz) from that of the missile.

The purpose of the offset is to overcome problems inherent in the high frequencies used in this system. It will be appreciated that at 60 GHz there are no precise crystals which will work to permit the two transmitters and receivers to lock up. While the frequency of lower frequency crystals can be multiplied up to achieve the desired frequency, it is difficult to maintain precise control due to drift of the oscillators. It is an advantage of the design of the present invention that instead of having three or four difficult-to-control sources as commonly are used in standard receivers and transmitters, only two sources are used to generate these high frequencies. That is, in the present invention, only two oscillators are utilized. Thus, the frequency of only two oscillators are offset so that the difference between the transmitted signals coming in from the missile and the local oscillator in the receiver in the airplane gives a frequency of some known value to be used as the intermediate frequency (IF), the difference frequency in the mixer. The long term stability of the 60.010 GHz signal is held to plus or minus about 3 KHz (0.05 PPM) through the use of an environmentally controlled crystal reference source 60.

A key to the overall system operation is that the aircraft utilizes the missile signal to lock up its own transmitter in order to achieve the required frequency stability. The frequency variation of this oscillator would be additive to the received signal. Therefore, a total deviation of 432 KHz must be accounted for in the aircraft receiver. To account for some system tolerance, a 500 KHz receiver bandwidth is employed, as controlled by the band pass filter 62.

To achieve the minimum desired system signal-to-noise ratio of 29 dB, a maximum pre-detection bandwidth of 50 KHz would be required. At least two feasible methods can lend themselves to this task. In the preferred embodiment of the present invention a 128 point fast Fourier transform (FFT) multi-channel filter system is used prior to a ganged Doppler detector in the Doppler detector FFT unit 64. The 128 point FFT utilizes 64 overlapping filters, each having a 10 KHz bandwidth. Reduction of the pre-detection bandwidth to 10 KHz would also increase the receiver's sensitivity by 7 dB for a total signal-to-noise ratio of 36 dB. Use of a multi-channel FFT filter system also allows the total spectrum to be scanned simultaneously, thus reducing total system reaction time.

Figure 4:
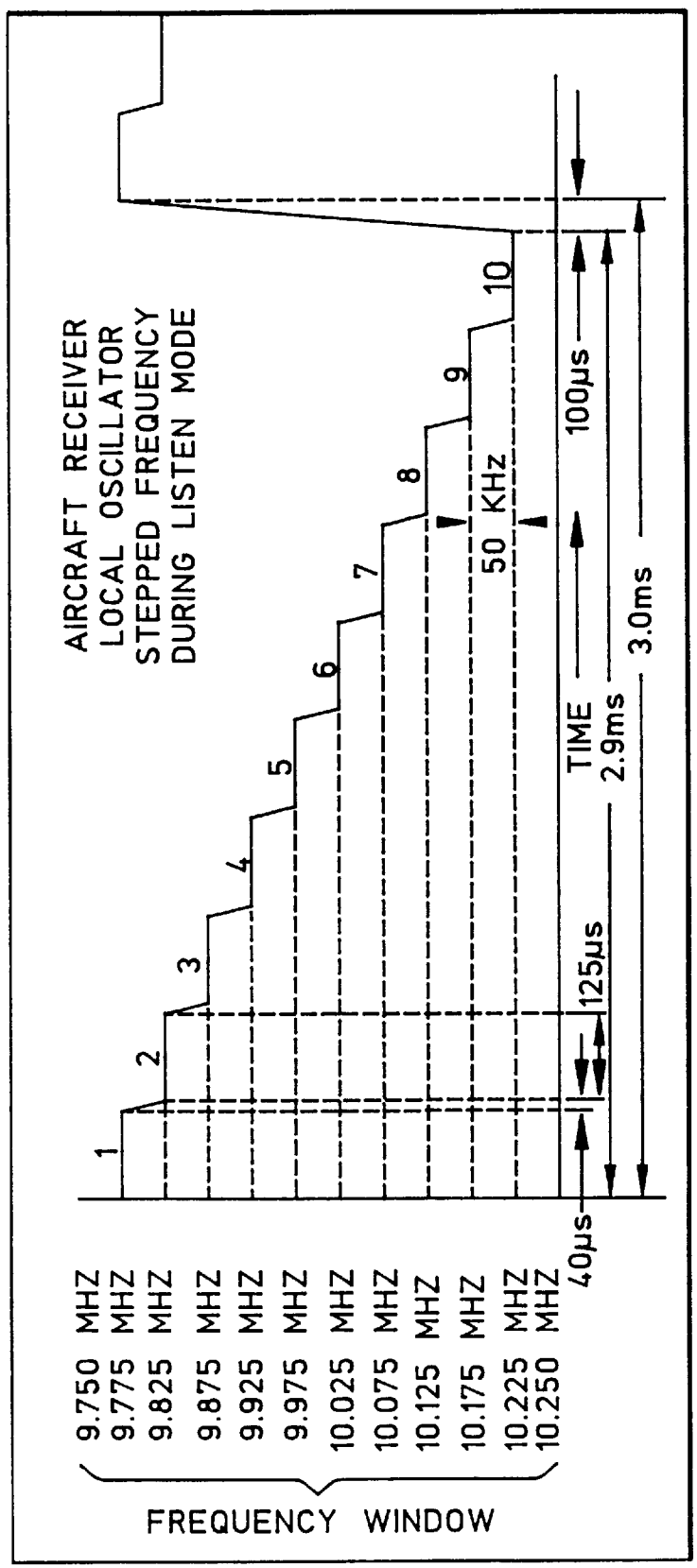
FIG. 4 is a graph of filter frequency versus time in an alternate method of achieving a pre-detection bandwidth of 50 kHz in accordance with the present invention.

In an alternative embodiment of the present invention, a pre-detection bandwidth of 50 KHz is achieved by utilizing a single fixed 50 KHz band pass filter, centered at 10 MHz. In this embodiment, the local oscillator 66 is stepped through 10 KHz steps. This can be accomplished by a direct digital synthesizer (DDS) which would be part of the local oscillator phase locked loop. FIG. 4 illustrates the function of such a DDS by plotting the frequency window versus time. Note that a pause of 125 microseconds occurs at each step which allows a signal, if present, to pass through the 50 KHz filter. When the proper step is reached and a signal is detected at the output of the 50 KHz band pass filter, the lock-on detectors stop the oscillator's stepping function which allows for further processing. Control logic unit 68 detects energy when the difference frequency passes through the selected FFT or 50 KHz filter.

In either case, whether the FFT approach or the DDS approach is used, the Doppler frequency is known within the oscillator stability limits. This is known by associating a unique digital number with each of the 64 contiguous filters contained in the FFT. The same is true of the DDS stepping oscillator. At any point in time, it is known within the resolvable limits what the filter frequency or output frequency is. This allows the transmit oscillator 58 to be adjusted precisely to offset its frequency by 10 MHz minus the Doppler frequency. The down converted frequency/phase of the GUNN transmitter 58 is compared in the phase detector 88 with the master oscillator signal summed with the doppler frequency correction and code information that is generated by the Doppler offset circuit 80. Any difference in these two input signals to the phase detector generates an error signal to the GUNN transmitter which corrects the transmitter frequency. A transmit command is then sent to the aircraft ferrite latching circulator 54 from the control logic unit 68 which allows the 60.01 GHz offset frequency plus Doppler compensation and code to be sent to the missile. The missile receiver therefore only sees the 10 MHz offset.

Also included in aircraft unit 46 is a local oscillator phase lock loop 70, frequency divider 72, oscillator 74, mixers 56 and 78, control logic 68, doppler offset frequency code select 80, summer 84, phase detector 88 and main phase lock loop 90. The control logic unit 68 detects the doppler signal from the missile interrogation. It commands (through line 73) a latching switch in the ferrite latch circulator 54 to redirect transmit energy to the antenna 50. The control logic unit 68 also commands the signal receiving antenna 50 to transmit through control line 75. The summer 84 subtracts the doppler offset frequency from the 10 MHz and sums the coding signal. It should be noted that the 10 MHz oscillator 74 is acting at a frequency of 10.0016 MHz.

The aircraft unit 46 can be easily modified to utilize the DDS instead of the FFT filter by replacing the Doppler detector FFT unit 64 with a 10 MHz, 50 KHz bandwidth filter and by replacing the 10 MHz oscillator 74 with a DDS stepping oscillator.

Referring again to FIG. 2A, the missile receives the offset frequency 92 and mixes it with its local oscillator in balanced mixer 94. The resulting signal is then passed through a 66 KHz bandwidth pre-detection filter 96 which has the function of rejecting as much noise energy over the frequency spectrum as possible. Noise competes with the received signal—the narrower the bandwidth, the higher the signal-to-noise ratio which establishes the receiver sensitivity. The limiting factor on the filter bandwidth is the frequency stability of the two independently running oscillators-local oscillators 34 and 66 in the receiver, and transmitter respectively. The two oscillators each have a stability of <0.5 parts per million or <30 KHz variation in frequency. This adds up to a bandpass filter of about 68 KHz (to account for drift of both oscillators). 66 KHz is used to give some margin for error. Thus, this bandwidth is set by the relative stability of both missile and aircraft phase lock loop transmitters.

The signal is then amplified in amplifier 98 and detected in envelope detector 100. Based on achieving a proper code, a command is then sent by the missile break engagement controller 102, to turn off the fuze and to pull a hard missile maneuver away from the aircraft intercept trajectory utilizing the missile autopilot system (not shown).

With regard to the coding scheme, it should be noted that various schemes can be employed for increased system security. The simplest would be the use of numerous offset frequencies, i.e., 10 MHz, 15 MHz, 20 MHz, etc. This could be implemented in a simple manner in selective divider networks shown in the applicable figures. The frequency divider 72 shown in FIG. 3A is a divide-by-12. This "divide by" number could be programmed for a different number and a different resultant offset frequency. This would require, in a cooperative (missile-aircraft) code system, the missile "divide by" number to change in the frequency divider (36) in FIG. 2A. A modulation coding scheme could also be employed on the transmitted signal which could be extracted by the missile receiver for correlation prior to influencing missile performance.

Installing the forward looking antenna 28 on a typical missile such as an AIM-9 missile can be a challenging task. Two options are currently considered appropriate. The first and simplest is a horn antenna similar to those used for the RAM missile RF guidance. The 0.4 inch diameter dielectric loaded horn would produce a beam width of approximately 23°. The second suggested antenna scheme would be imbedded in the forward tapered (8°) section behind the spherical IR dome. A small 0.4 inch aperture would radiate perpendicular to the missile skin but would be reflected forward by an RF mirror embedded in a dielectric "bubble" which would protect the antenna and minimize missile drag. For the aircraft mounted antenna 50, depending on the type of aircraft and volumetric protection required, an array of either four or eight antennas would be utilized. Eight antennas, properly arranged could provide $4\pi$ steradian coverage while four antennas could cover a single hemisphere.

To simplify aircraft installation, two independent self-contained systems could be installed, one on top to cover the upper hemisphere and one on the bottom to cover the lower hemisphere in a preferred embodiment. Each unit would contain its own solid state transceiver with a common frequency control system, a processor for the antennas, each having a plus or minus 60° beam width. Each unit would be externally mounted on the aircraft skin. Each antenna would be sampled sequentially until a missile signal is received. At this time the sampling is stopped and the interrogation and response as described above is initiated.

For aircraft which are typically not highly maneuverable, i.e., non-fighters, and which would most likely be attacked from the proximity of their horizontal plane, a single four-antenna system should provide adequate protection.

The above missile shield system 10 can be built in a very small size with a simple design that results in a low-cost system that can be installed on virtually all required missiles and aircraft. Moreover, required system sensitivities can be achieved at the specified ranges through the use of the above-described narrow band receiver system and solid state transmitters phase locked to highly stable crystal sources.

Figure 5:
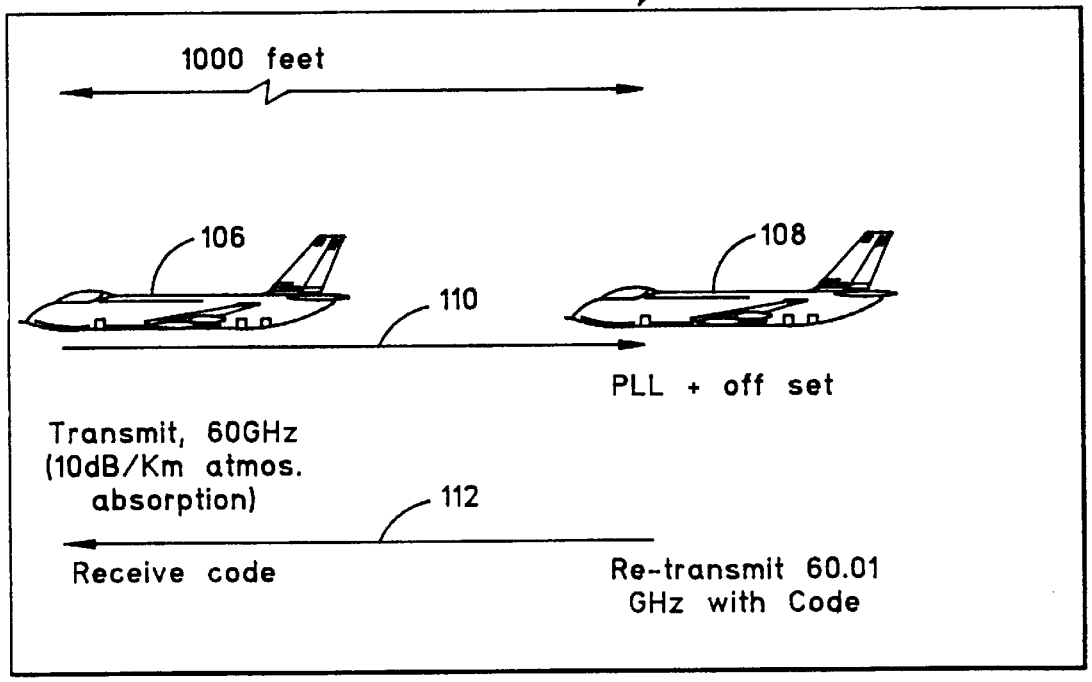
FIG. 5 is a diagram of a general purpose covert communication system in accordance with the present invention.

Referring now to FIG. 5, a covert communication system in accordance with the present invention is shown. Because of the very limited range and antenna directionality, the communication techniques of the missile shield system described above can also be used to achieve covert communications between two aircraft in the same flight while maintaining electronic communication (ECOM) silence. In a manner similar to that described above in connection with FIG. 1, aircraft 106 will transmit a 60 GHz signal 110 to aircraft 108. Aircraft 108 will then retransmit the 60.01 GHz signal with the code 112. That is, signals 16 and 18 will be transmitted and received and processed in a similar manner as described above and shown in FIG. 1. As discussed above, due to the high atmospheric absorption (such as 10 Db/km) at this frequency, communication between the aircraft 106, 108 will only be possible at relatively short distances, such as less than 3,000 feet. However, for the same reason, these communication signals will be undetectable by any other aircraft at greater distances. Furthermore, due to the narrow bandwidth, code and other features described above, even an outside aircraft within range would have great difficulty in detecting and interpreting the signal. However, it will be appreciated that in order to add the desired communication signal between the two aircraft 106, 108, some modifications may be necessary to the missile unit 20 and aircraft unit 46 shown in FIGS. 2A and 3A. These modifications may include for example, a two way communication link as follows: The aircraft 106, 108 would have a frequency modulator circuit 114 (shown in FIG. 3A) located between the frequency divider 72 and 10 MHz oscillator. Modulator circuit 114 would superimpose the communication signal on the 10 MHz oscillator carrier. This signal would be sent to the phase detector 88 which would result in modulating the GUNN transmitter. The received communication signal in the aircraft 106, 108 would require a detector/filter circuit 116 to be located between the input amplifier stage 79 and the mixer 76. The detector output would contain the received communication signal.

It should also be noted that the communications system 104 (FIG. 5) may have other applications in addition to aircraft-to-aircraft communications, such as close proximity communication between air and ground, ground-to-ground, or other configurations where close range and highly covert communications are desired.

In this embodiment of the present invention, the covert communication system 104 allows communications between first and second aircraft 106 and 108. Alternatively, many of the same advantages of the present invention may be achieved by utilizing the same techniques but employing low power X-band signals instead of millimeter wavelength. That is, a limited range, low power, narrow bandwidth transceiver at the X-band, made in accordance with the teachings of the present invention, will also result in a very secure, covert, short range communication system.

A number of embodiments of the present invention have been described. Nevertheless, it will be understood that various modifications may be made without departing from the spirit and scope of the invention. For example, the logical and physical organization of the components of the present invention may differ from those that are disclosed without departing from the scope of the present invention, as will be clear to one of ordinary skill in this technical field. Accordingly, it is to be understood that the invention is not to be limited by the specific illustrated embodiment, but only by the scope of the appended claims.

We claim:

1. An Identified-Friend-or-Foe system comprising:

first transceiver means on a first platform for transmitting and receiving signals in the millimeter wavelength range;

second transceiver means on a second platform for receiving signals transmitted by the first transceiver and transmitting a coded signal in response thereto; and a processor for receiving and interpreting the coded signal from the second transceiver and providing an output signal in response thereto.

2. A method of Identifiying Friend-or-Foe comprising the steps of:

(a) transmitting and receiving signals in the millimeter wavelength range between a first platform and a second platform;

(b) receiving signals by the second platform transmitted by the first platform and, in response thereto, transmitting a coded signal from the second platform to the first platform; and (c) receiving and interpreting the coded signal from the second platform.

3. The system of claim 1, and further comprising means for determining when the first platform is within a predetermined distance of the second platform.

4. The system of claim 3, wherein the means for determining includes means for transmitting a radar signal to the second platform and means for determining when the radar signal received back from the second platform exceeds a predetermined threshold.

5. A method of Identifiying Friend-or-Foe comprising the steps of:

(a) transmitting and receiving signals in the X-band range between a first platform and a second platform;

(b) receiving signals by the second platform transmitted by the first platform and, in response thereto, transmitting a coded signal from the second platform to the first platform; and (c) receiving and interpreting the coded signal from the second platform.

6. An Identification-Friend-or-Foe (IFF) system comprising:

first transceiver means on a first platform for transmitting and receiving signals in the millimeter wavelength range;

second transceiver means on a second platform for receiving signals transmitted by the first transceiver and transmitting a coded signal in response thereto;

a processor for receiving and interpreting the coded signal from the second transceiver and providing an output signal in response thereto; and means for determining when the first platform is within a predetermined distance of the second platform, said means for determining including means for transmitting a radar signal to the second platform and means for determining when the radar signal received back from the second platform exceeds a predetermined threshold.

7. The system of claim 1, wherein the first and second transceivers have narrow pre-detection bandwidth, and further include means for locking on the frequency of the incoming signal.

8. The system of claim 7, wherein the first and second transceivers include means for compensating for the Doppler shift of the received signals.

9. An Identification-Friend-or-Foe (IFF) system comprising:

first transceiver means on a first platform for transmitting and receiving signals in the millimeter wavelength range;

second transceiver means on a second platform for receiving signals transmitted by the first transceiver and transmitting a coded signal in response thereto, wherein the first and second transceivers have narrow a pre-detection bandwidth and further include means for locking onto a frequency of an incoming signal; and a processor for receiving and interpreting the coded signal from the second transceiver and providing an output signal in response thereto.

10. The system of claim 7, wherein the means for locking includes a fast Fourier transform multi-channel filter system.

11. The system of claims 10, wherein the fast Fourier transform multi-channel filter system includes a plurality of overlapping filters each having a predetermined bandwidth, whereby the total spectrum can be scanned simultaneously to reduce system reaction time.

12. The system of claim 7, wherein the means for locking comprises a single bandpass filter which steps through a plurality of discrete steps.

* * * * *